United States Patent [19]

Hellmick et al.

[11] Patent Number: 4,893,322

[45] Date of Patent: * Jan. 9, 1990

[54] FILM CHANGER

[75] Inventors: Mark Hellmick, Canoga Park; Leif A. Johansson, Agoura; Otto Weber, Chatsworth, all of Calif.

[73] Assignee: Medrad, Inc., Pittsburgh, Pa.

[*] Notice: The portion of the term of this patent subsequent to Nov. 1, 2005 has been disclaimed.

[21] Appl. No.: 798,310

[22] Filed: Nov. 15, 1985

[51] Int. Cl.[4] .............................................. G03B 42/02
[52] U.S. Cl. ..................................... 378/173; 378/165; 378/166
[58] Field of Search ............... 378/101, 104, 110, 114, 378/163, 165–167, 171, 173–175, 181; 355/14 SH; 206/387, 455, 602

[56] References Cited

U.S. PATENT DOCUMENTS

| | | | |
|---|---|---|---|
| 3,553,453 | 1/1971 | Hogan | 378/173 |
| 3,567,931 | 3/1971 | Eelkema | 378/171 |
| 3,636,351 | 1/1972 | Lajus | 378/173 |
| 3,710,106 | 6/1973 | Louchenr et al. | 378/166 |
| 3,735,130 | 5/1973 | Bock et al. | 378/171 |
| 3,775,613 | 11/1973 | Hommerin | 378/173 |
| 3,827,070 | 7/1974 | Hoerenz et al. | 378/166 |
| 3,865,482 | 2/1975 | Bendall et al. | 355/11 |
| 3,891,850 | 6/1975 | Bridgeman | 378/173 |
| 3,989,950 | 11/1976 | Hunt et al. | 378/173 |
| 3,998,118 | 12/1976 | Brophy et al. | 355/28 |
| 4,006,985 | 2/1977 | Huther | 355/3 FU |
| 4,025,187 | 5/1977 | Taylor et al. | 355/14 SH |
| 4,199,687 | 4/1980 | Brendl et al. | 378/171 |
| 4,204,668 | 5/1980 | Yanagawa | 355/14 SH |
| 4,234,796 | 11/1980 | Caugant et al. | 378/173 |
| 4,250,389 | 2/1981 | Brendl et al. | 378/166 |
| 4,317,999 | 3/1982 | Amtmann et al. | 378/114 |
| 4,346,297 | 8/1982 | Suzuki et al. | 378/110 |
| 4,482,232 | 11/1984 | Engelsmann et al. | 354/275 |
| 4,521,097 | 6/1985 | Kuehrle et al. | 355/15 |
| 4,597,097 | 6/1986 | Suzuki | 378/174 |
| 4,782,504 | 11/1988 | Weber et al. | 378/181 |

FOREIGN PATENT DOCUMENTS

| | | | |
|---|---|---|---|
| 1931645 | 12/1970 | Fed. Rep. of Germany | 378/173 |
| 2456448 | 8/1976 | Fed. Rep. of Germany | 378/166 |
| 2745994 | 4/1979 | Fed. Rep. of Germany | 378/166 |
| 0000300 | 7/1906 | United Kingdom | 206/408 |
| 1096802 | 12/1967 | United Kingdom | 378/167 |

Primary Examiner—Craig E. Church
Assistant Examiner—John C. Freeman
Attorney, Agent, or Firm—Fleit, Jacobson, Cohn, Price, Holman & Stern

[57] ABSTRACT

Disclosed is a film feeding mechanism for use during medical x-ray techniques, particularly angiography. Sheets of film are fed sequentially at high speed into and out of a film exposure device, by a feed mechanism including continuously driven feed wheels and movable pinch rollers, in a manner so as to reduce damage to the films, including the build-up and discharge of static charge on the films. In the film exposure device, a free-floating lower clamping assembly, having a natural substantially flat configuration, clamps each film against an upper clamping assembly from the center of the film progressively outward towards its leading and trailing ends, to eliminate wrinkling of the film. A firing command is transmitted to an X-ray generator before each unexposed sheet of film reaches the exposure position and each cycle of operation is accomplished by energizing a single revolution clutch connectable to a continuously running, constant speed motor.

43 Claims, 7 Drawing Sheets

U.S. Patent    Jan. 9, 1990    Sheet 1 of 7    4,893,322
FIG. 1
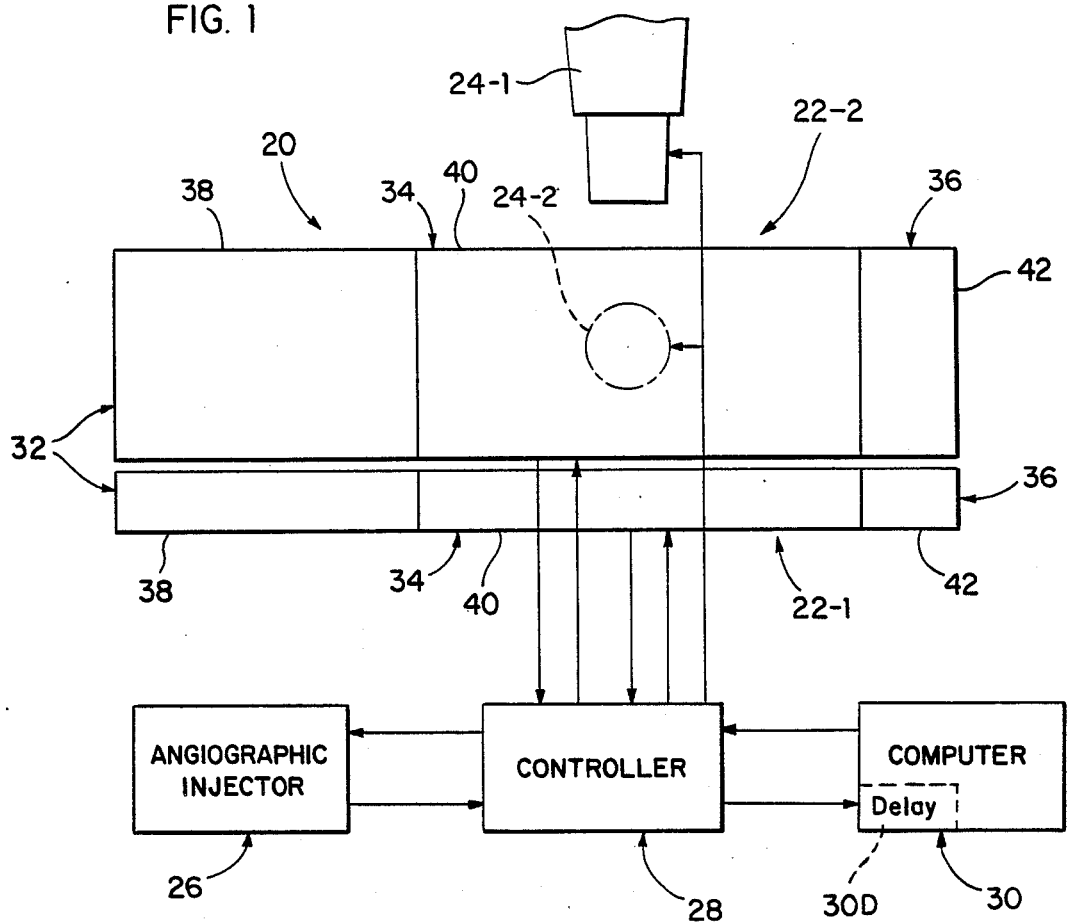
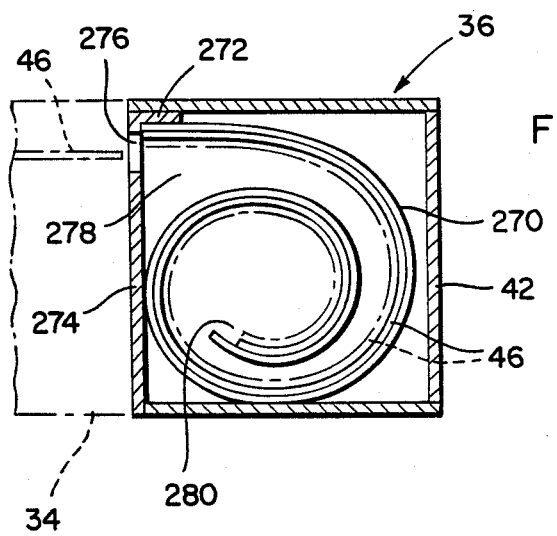
FIG. 14
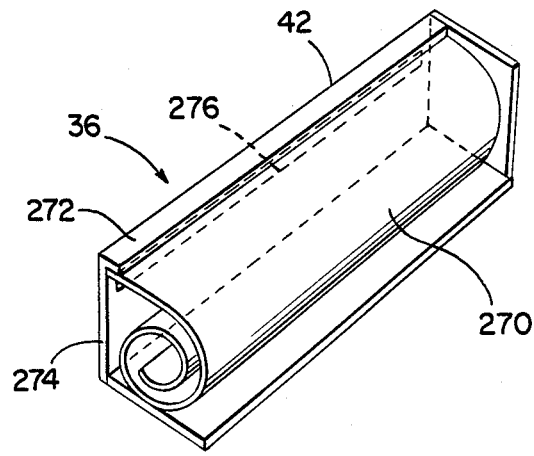
FIG. 15

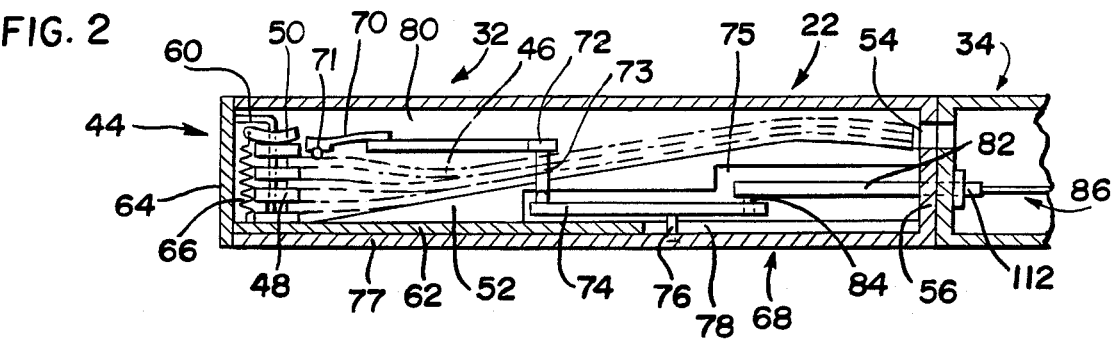
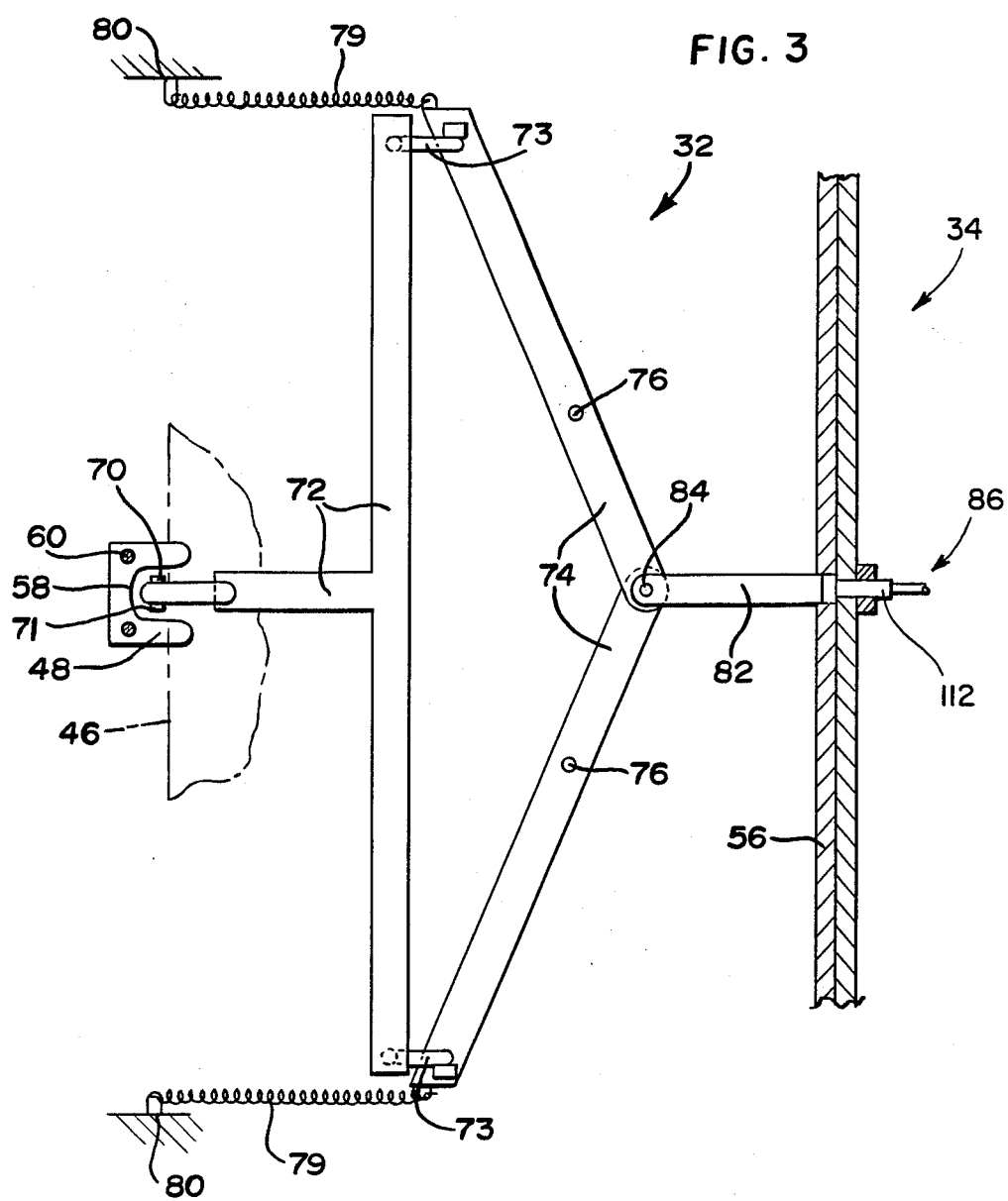

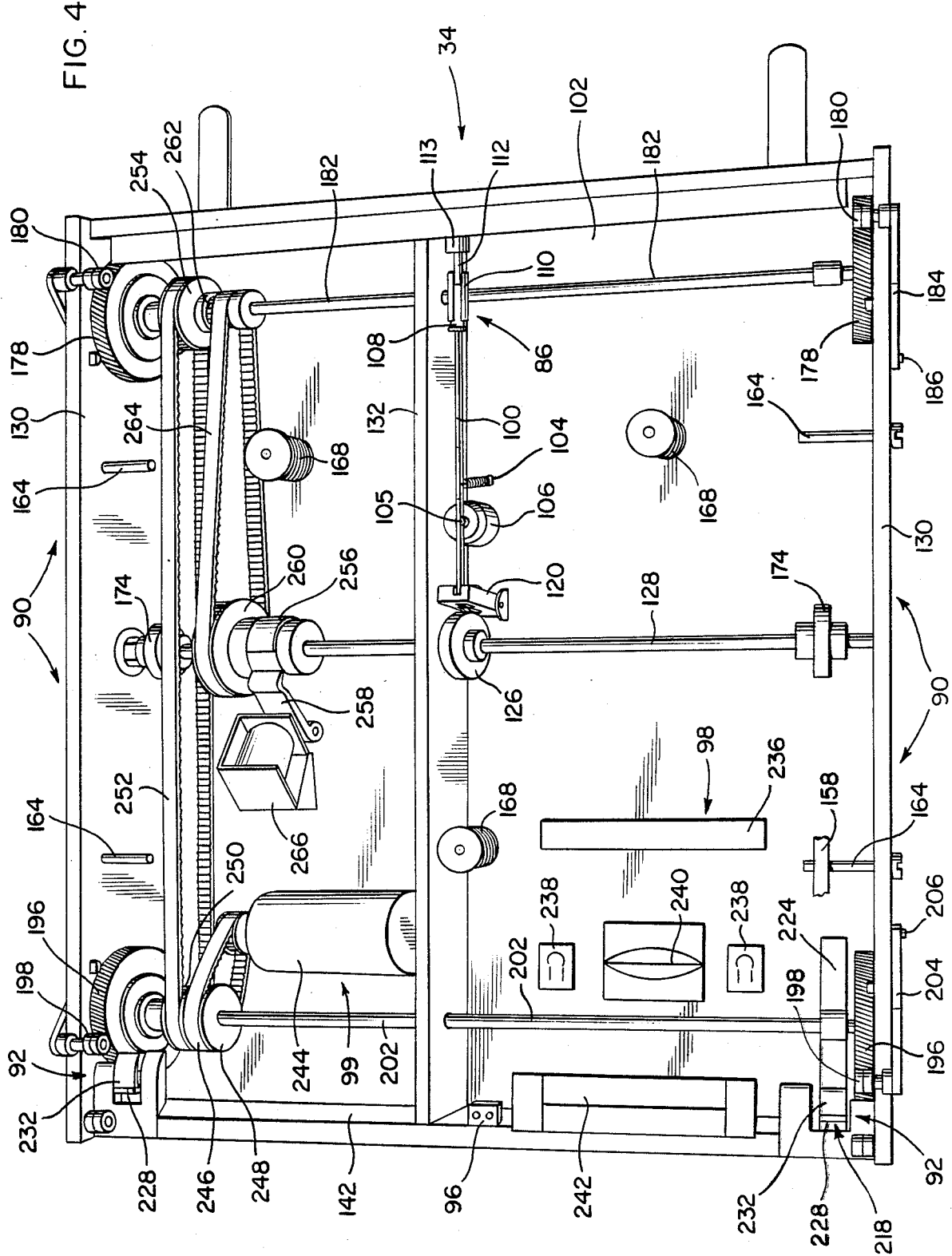

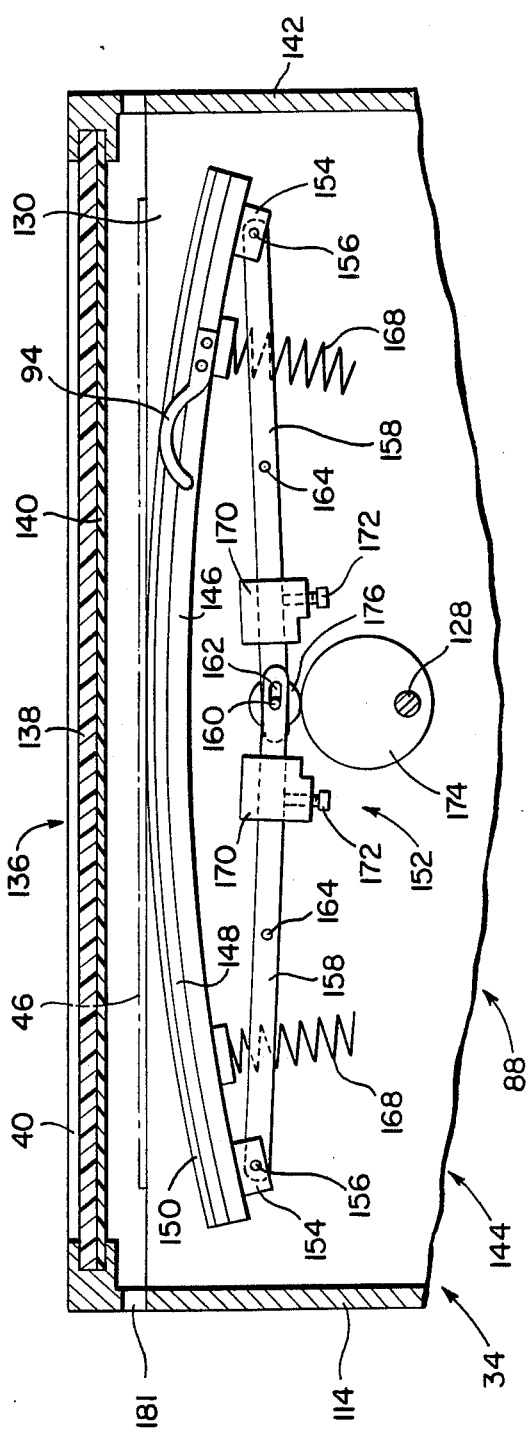
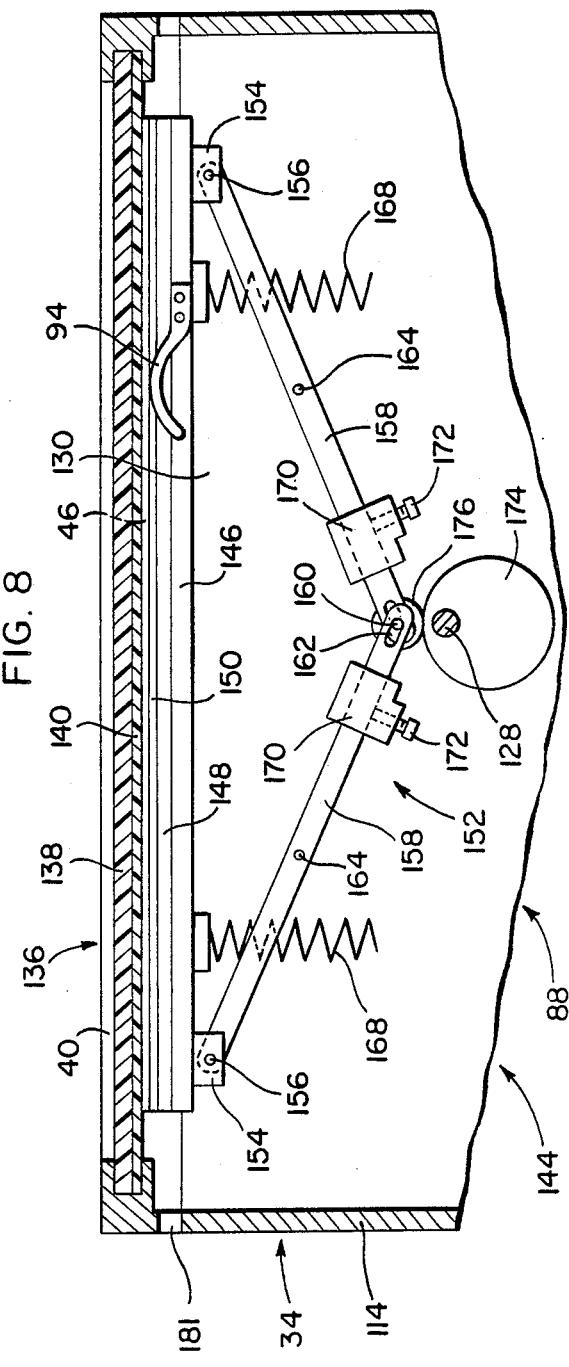

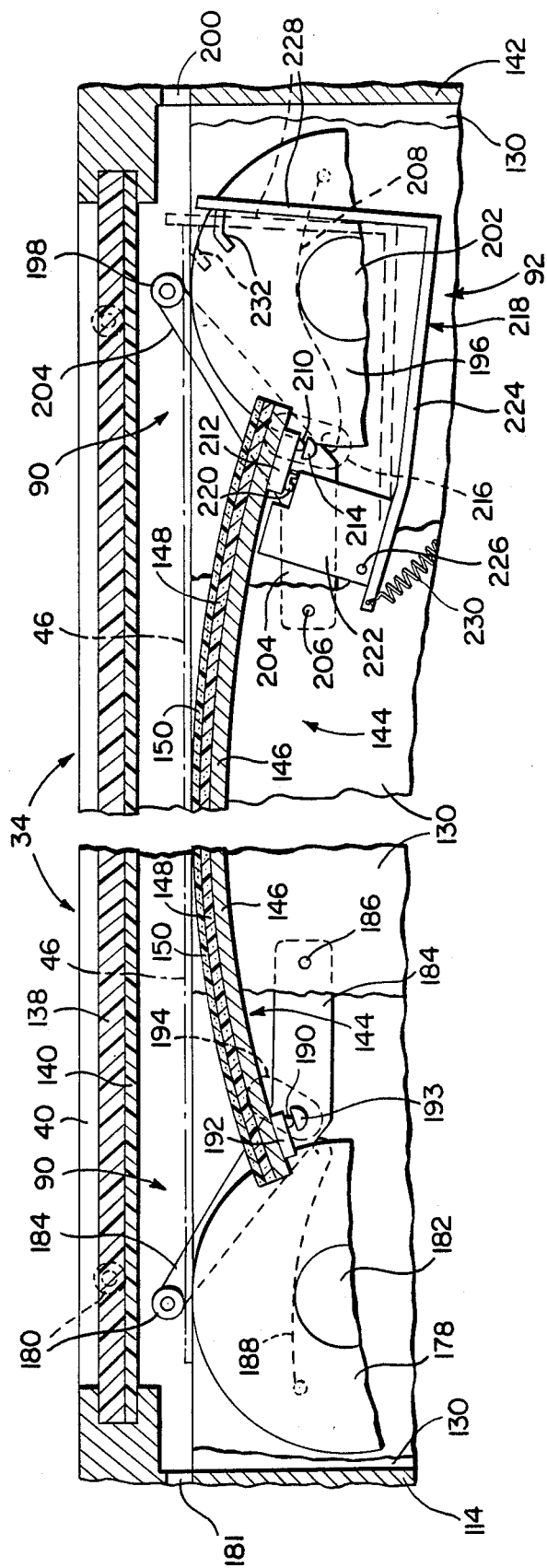
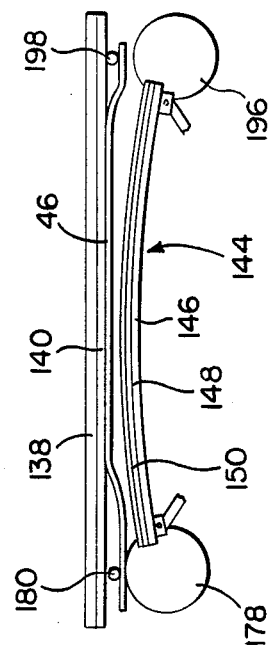
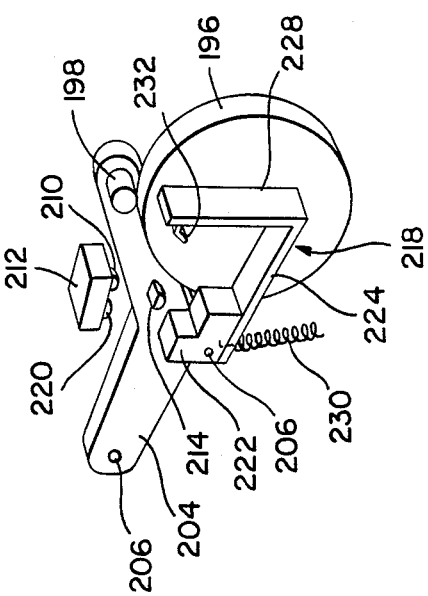

FILM CHANGER

FIELD OF THE INVENTION

This invention relates to a film changer, and more specifically to an x-ray film changer which is especially suited for use with an angiographic device and which produces precision high quality x-rays films having excellent resolution, operates a high speed and low power level, is simple to maintain, and is low in weight.

DESCRIPTION OF PRIOR THE ART

A known x-ray film changer comprises a magazine for holding sheets of precut x-ray films, an x-ray film exposure device for holding a sheet of x-ray film during exposure of the film to x-rays from an x-ray generator, and a receiving tray into which each exposed sheet of film is fed after an exposure operation. The exposure device comprises a pair of opposed x-ray intensifying screens, one being mounted on an upper downwardly curved backing plate and the other being mounted on a lower vertically movable planar pressure plate. After a sheet of film has been fed into the exposure holding device between the intensifying screens, the lower planar pressure plate is moved upwardly to engage the sheet of film between the screens, with the pressure plate applying pressure so as to move the downwardly curved upper backing plate and the intensifying screen thereon, into a flattened configuration with the sheet of film held between the intensifying screens for an exposure operation. After the exposure operation, the exposed sheet of film feeds out of the exposure device into a feed tunnel and around a feed-out discharge roller into a receiving tray beneath the exposure device. Operation of the film changer is accomplished through a system of gears and control cams.

The above described film changer possesses a number of disadvantages. For example, the film changer has limited operating speed, is subject to film-jamming and requires numerous mechanical and electrical adjustments by skilled personnel, thereby resulting in high maintenance costs. More specifically, the prior art device derives its timing from cam-activated switches mounted on several rotating shafts and complex electrical logic circuits are required to ensure proper operation of a film cycle. In addition, the main drive motor speed must be carefully controlled to match film feed rate. This becomes a significant problem when synchronized operation of two film changers is required. Another disadvantage exists in that the delay between the film changer command to the associated x-ray generator(s) to fire and the actual onset of x-rays is a variable that is inconvenient to adjust. In fact, it requires careful adjustments to electronic control logic and mechanical parts to achieve proper calibration.

The construction and operation of the prior art film changer also is such that it tends to scratch the film as the film is fed through the changer, and also tends to build up static electricity on the film, which tends to discharge at isolated points as the exposed film is fed to the receiving tray, or is subsequently removed from the receiving tray, thereby producing an undesirable "rain tree" effect on the exposed film. This film changer also requires that the lower pressure plate apply a high clamping pressure to the film for an exposure operation, in order to move the downwardly curved backing plate and the x-ray intensifying screen thereon into a flattened configuration and to clamp the x-ray film firmly between the plates. Further, since the upper backing plate and an associated support frame must be relatively thick to withstand continuous flexing, the object being x-rayed is located a considerable distance from the film during an x-ray exposure in which the patient's body must make contact with the upper plate, thereby decreasing image resolution and contrast. Further, the receiving tray is heavy and bulky, causing inconvenient handling by the machine operators. Another disadvantage is that a film marking system requires a typed or printed label to be prepared and manually inserted into the film changer for recording identification information on the film.

SUMMARY OF THE INVENTION

In general, a film changer in accordance with the invention comprises a magazine for holding a plurality of unexposed sheets of film, a film exposure device for receiving a sheet of film from the magazine for an exposure operation, and a film receiving cassette for receiving an exposed sheet of film from the exposure device after the exposure operation has been completed. The film exposure device includes a film backing plate and a film pressure plate for receiving the sheet of film therebetween, the pressure plate being movable toward and away from the backing plate. As the pressure plate moves away from the backing plate for the reception of a sheet of film in an exposure position, the pressure plate is flexed into a convex configuration, and as the pressure plate is moved toward the backing plate to clamp the sheet of film in the exposure position, outer ends of the pressure plate move back to initial positions such that the pressure plate applies pressure to the sheet of film progressively outwardly from the center of the sheet of film toward opposite ends or corners thereof.

The magazine includes a film-feeding mechanism which is operated by an actuating mechanism in the film exposure device and which cooperates with a feed-in mechanism of the film holding device, to feed sheets of film into the film exposure device. The film exposure device also includes a film feeding mechanism for feeding an exposed film into the film-receiving cassette, which comprises a guide plate formed in an inwardly spiraled configuration having an open end and an inner end, with the film being fed into the open end of the spirally formed guide plate such that the film travels along an interior surface of the guide plate and assumes the spiral configuration thereof. A programmable delay circuit also is provided to initiate firing of an associated x-ray generator before the film actually reaches the exposure position, to increase the film processing rate.

More specifically, the film exposure device includes a foam pad on the pressure plate for equalizing pressure on a film supported between the backing plate and the pressure plate during an exposure operation. Further, a mechanism for moving the pressure plate and flexing the pressure plate into a convex configuration, comprises first and second levers having outer ends pivoted to respective outer ends of the pressure plate and inner ends pivoted to one another. The levers also are pivoted intermediate their ends on suitable supports. As a cam mechanism which is selectively driven by a constant speed motor, causes movement of the pivotally interconnected inner ends of the levers toward the backing plate, the levers are pivoted about their respective intermediate supports, thereby causing movement of the pressure plate away from the backing plate and flexing of the outer ends of the pressure plate away from the backing plate into the above mentioned convex configuration. The pressure plate is moved toward the backing plate by resilient mechanisms which urge the outer ends of the backing plate in that direction, and by counterweights mounted on inner end portions of the levers to counteract the weight of the pressure plate, such that the pressure plate is essentially free-floating.

The film exposure device further includes feed-in wheels and pinch rollers located adjacent an entrance end of the device and feed-out wheels and pinch rollers located adjacent an exit end of the device. The feed-in wheels and feed-out wheels are continuously driven and the pinch rollers are moved out of and into film-feeding positions in response to movement of the pressure plate toward and away from the backing plate, respectively. Preferably, the feed-in rollers are moved into feeding engagement with an exposed film after an exposure operation, prior to the feed-out rollers being moved into feeding engagement with the film, to cause buckling of at least an intermediate portion of the film away from the backing plate, thereby precluding sticking of the exposed film in the exposure device and reducing scratching of the film as it is fed out of the exposure device. The feed-out wheels are preferably driven by a slightly faster rate than the feed-in wheels to preclude film-jamming as a result of a new film feeding into the film exposure device over an exposed film. The film feeding and clamping cycle of the device is constant in duration regardless of variations in film exposure rates.

Stop mechanisms are provided for properly locating a film in an exposure position. An optical sensor mechanism determines when a film has been properly fed into and out of the exposure position, and causes de-energization of the film changer and an associated angiographic injector when a film has not been properly fed. An optical-type mechanism is provided for exposing a portion of the film to place various indicia on the film in the exposure device. Further, the actuating mechanism for operating the feed mechanism in the film magazine is capable of being selectively deactivated.

An object of the invention is to provide a new and improved film changer which is of low maintenance construction, operates at high speed and at a low power level, and produces a precise and clear x-ray image of high resolution on a film.

Another object of the invention is to provide a new and improved film changer which essentially eliminates scratching of the film as the film is fed through the film changer, and which essentially eliminates the buildup of static electrical charge on the film and/or subsequent discharge of the electrical charge, and the resultant "rain tree" effect on the film.

A further object of the invention is provide a new and improved film changer in which sticking of an exposed film in a film exposure device, and resultant damage to the film, is essentially eliminated.

Another object of the invention is to provide a new and improved film changer in which a film is accurately located and clamped in an exposure position with a low uniform pressure over the entire surface of the film.

A further object of the invention is to provide a new and improved film changer in which an exposed film is received and stored in a small space for subsequent developing.

An additional object of the invention is to provide a new and improved film changer which produces a clearly readable identifying indicia on a film during a film exposure operation, generated dynamically under computer control rather than by manual insertion of printed labels.

Another object of the invention is to provide a new and improved film changer in which as associated device, such as an angiographic injector, is deactivated in the event of a malfunction in the feeding of the film through the film changer.

A further object of the invention is to provide new and improved apparatus comprising two film changers arranged in planes perpendicular to one another and connected to an associated device, such as an angiographic injector or multiple x-ray generators, in which one of the film changers and the angiographic injector are able to continue the ongoing procedure in the event of a malfunction in the other film changer. The two film changers, under normal conditions, also can be made to fire alternately, simultaneously, or individually under computer control.

An additional object of the invention is to increase the amount of time available for exposure to x-rays when the film changer is run at all feed rates, which is important for x-ray magnification studies which require longer exposures to compensate for reduced x-ray focal spot size and is a significant advance over the prior art.

A further object of the invention is to allow changes in the delay between the command(s) to the x-ray generator(s) and the actual onset of a film exposure to be easily modified under computer control.

Another object of the invention is to control the timing of the system by means of a central drive shaft without using switches to time significant events in the film cycle, thus avoiding the use of servo-control of drive motor velocity and complex electronics.

BRIEF DESCRIPTION OF THE DRAWINGS

FIG. 1 is a schematic view of a film changing system in accordance with the invention, in association with an angiographic injector;

FIG. 2 is a cross-sectional view of a film magazine of a film changer in accordance with the invention;

FIG. 3 is a schematic plan view of a film feed mechanism of the film magazine shown in FIG. 2;

FIG. 4 is an isometric view of an interior portion of the film exposure device of the film changer in accordance with the invention, with upper portions of the device removed;

FIG. 7 is a cross-sectional view of a film clamping mechanism of the film exposure device in an open film-receiving position;

FIG. 8 is a cross-sectional view of the film clamping mechanism shown in FIG. 4, in a closed film-clamping position;

FIG. 9 is an enlarged elevational cross-sectional view of entrance and exit portions of the film exposure device;

FIG. 10 is a partial isometric view of an exit end portion of the film exposure device;

FIG. 11 is a schematic elevational view illustrating a film-feeding feature of the film exposure device;

FIG. 14 is a cross-sectional view of a film-receiving cassette of the film changer in accordance with the invention; and FIG. 15 is a partial isometric view of the film-receiving cassette shown in FIG. 14.

DETAILED DESCRIPTION OF THE DRAWINGS

Figure 5:
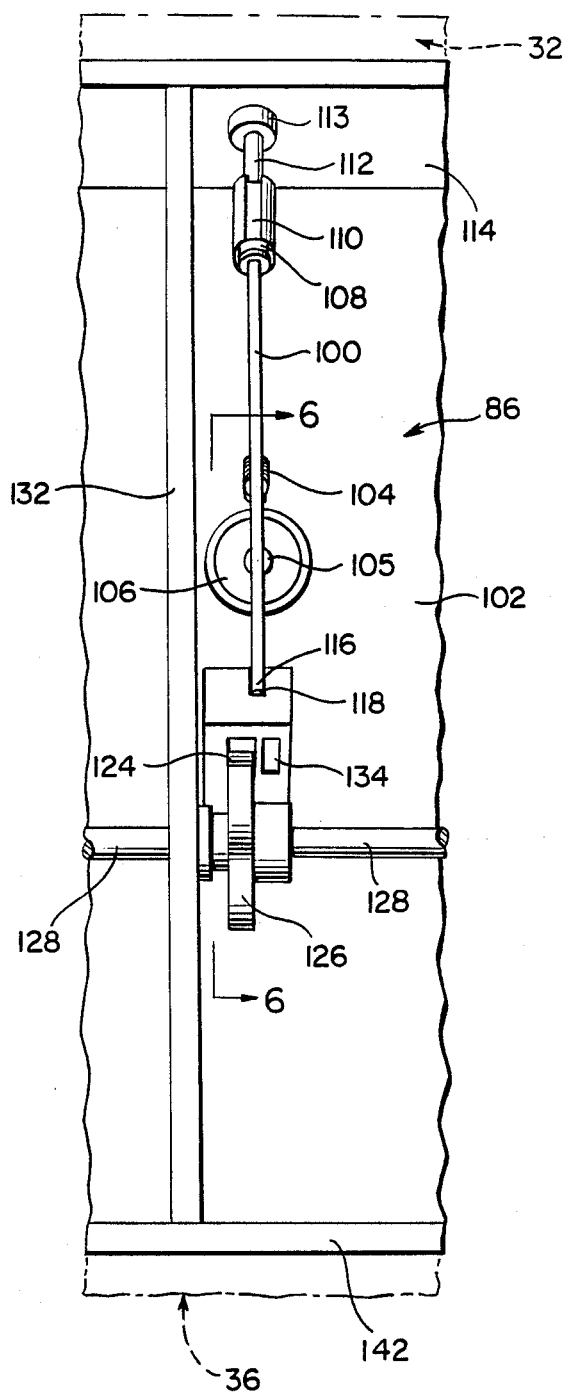
FIG. 5 is an enlarged view of a film feed actuating mechanism of the film exposure device.

Referring to FIG. 1, a system 20 in accordance with the invention may comprise a first x-ray film changer 22-1 arranged in a horizontal plane and a second x-ray film changer 22-2 arranged in a vertical plane perpendicular to the horizontal plane, for producing x-rays of an object, such as a part of a human body, in two directions simultaneously. For this purpose, each of the film changers 22-1 and 22-2 is associated with a suitable x-ray generator 24-1 and 24-2, respectively, for producing the x-rays in a known manner.

In the system 20 shown in FIG. 1, the film changers 22-1 and 22-2 are also associated with an angiographic injector 26 of a known commercial type, such as that available from Medrad, Inc., of Pittsburgh, Pennsylvania, under the trade names "Mark IV" and "Mark V", for injecting a tracer fluid, such as iodine, into the person being x-rayed, for the purpose of producing a series of x-rays in sequence at desired time intervals. The film changers 22-1 and 22-2, x-ray generators 24-1 and 24-2 and the angiographic injector 26 all are connected to a controller 28 operated from a suitably programmed computer 30. Operation of the film changers 22-1 and 22-2 individually, or synchronization of the film changers for operation in alternate or simultaneous modes is accomplished by suitable electronic control circuits in the controller 28, and precise timing is provided by the computer 30, which activates the film feed cycles in both of the film changers.

Each of the film changers 22-1 and 22-2 includes a film magazine 32, a film exposure device 34 and an exposed film-receiving cassette 36, with the film magazine and the film-receiving cassette being removably mounted on the film exposure device in a suitable manner (not shown). The film magazine 32, film exposure device 34 and film-receiving cassette 36 also include suitable outer housings 38, 40 and 42, respectively.

Referring to FIG. 2, the film magazine 32 of each film changer 22 comprises a removable slide tray 44 for holding a plurality of superimposed sheets 46 of x-ray film in stacked relationship, with left-hand ends of the film sheets, as viewed in this figure, in spaced relationship to facilitate feeding of the film sheets one at a time to the film exposure device 34. The left-hand ends of the film sheets 46 are maintained in spaced relationship by a plurality of plastic separators 48 urged into clamping engagement with the films by a springbiased clamping member 50. The right-hand ends of the film sheets 46, as viewed in FIG. 2, rest upon an upwardly inclined support member 52 of the slide tray 44 so as to be in general alignment with an exit feed slot 54 in an end wall 56 of the film magazine 32.

As is best shown in FIG. 3, each of the plastic film separators 48 is of essentially U-shaped configuration, having a base portion and projecting side legs defining a slot 58 therebetween. The base portion of each plastic separator 48 includes apertures which receive respective ones of right angle guide rods 60 having lower ends mounted on a bottom wall 62 of the slide tray 44 and upper ends mounted on a vertical front wall 64 of the slide tray, such that the separators are moveable on the guide rods for the positioning of the ends of the film sheets 46 therebetween. The spring-biased clamping member 50 (FIG. 2) is also a U-shaped construction and is slideably mounted on the guide rods 60 in the same manner as the separator plates 48, with coil springs 66 (only one shown) connected between opposite sides of the clamping member and the bottom wall 62 of the slide tray 44.

The film magazine 32 further comprises a film feeding mechanism 68 which includes a film pick-up hook 70 having a film-engaging support roller or rollers 71 mounted on an under side thereof. At its right hand end, as viewed in FIGS. 2 and 3, the pick-up hook 70 is secured to a central perpendicular projection of a transversely extending support bar 72. The support bar 72 has opposite ends fixed to upper ends of posts 73 disposed on opposite sides of the film support member 52 and pivoted at their lower ends to outer ends of a pair of scissors-type operating levers 74.

The operating levers 74 are disposed in a lower cavity 75 in the film support member 52 and are pivotally mounted intermediate their ends on pins 76 mounted in a bottom wall 77 of the film magazine 32 and disposed to be received in elongated slots 78 in the bottom wall 62 of the slide tray 44 when the slide tray is assembled in the film magazine. As viewed in FIG. 3, the outer ends of the operating levers 74 are biased to the left by coil springs 79 connected between the outer ends of the levers and side walls 80 of the film magazine. Inner ends of the operating levers 74 are pivoted to one another and one end of a push rod 82, by a pin 84. The push rod 82 has an opposite end normally disposed in an aperture in the end wall 56 of the film magazine 32.

In a film feeding operation, when the film pick-up hook 70 is moved to the left in FIGS. 2 and 3 by the action of the coil springs 79, the hook and roller(s) 71 move between the slots 58 in the film separator clamping member 50 and the film separator or separators 48 which are then above the uppermost sheet of film 46 in the film magazine 32, such that the hook engages the trailing edge of the uppermost sheet of film. Then, as the push rod 82 is moved to the left in FIGS. 2 and 3, by an actuating mechanism 86 in the film exposure device 34, the pick-up hook 70 slides the uppermost sheet of film 46 through the exit slot 54 in the end wall 56 into the film exposure device.

In addition to the film feed actuating mechanism 86 (FIGS. 4, 5 and 6), the film exposure device 34 comprises a film clamping mechanism 88 (FIGS. 7-9) for clamping one of the sheets of film 46 in an exposure position in the device. The film exposure device 34 further includes a film feeding mechanism 90 (FIGS. 4 and 9) for feeding one of the sheets of film 46 received from the film magazine 32, into the exposure position, and for feeding the exposed sheet of film out of the exposure position into the film-receiving cassette 36 after an exposure operation. In addition, a first stop mechanism 92 (FIGS. 4, 9 and 10) and a second stop mechanism 94 (FIGS. 7 and 8) are provided for locating the sheet of film 46 in the exposure position, a film-sensing device 96 (FIG. 4) is provided for determining whether or not one of the sheets of film has been properly fed into and out of the exposure position, and a printing mechanism 98 (FIG. 4) is provided for printing desired indicia along an edge portion of the film during an exposure operation. The film exposure device 34 further includes a drive mechanism 99 (FIG. 4).

Figure 6:
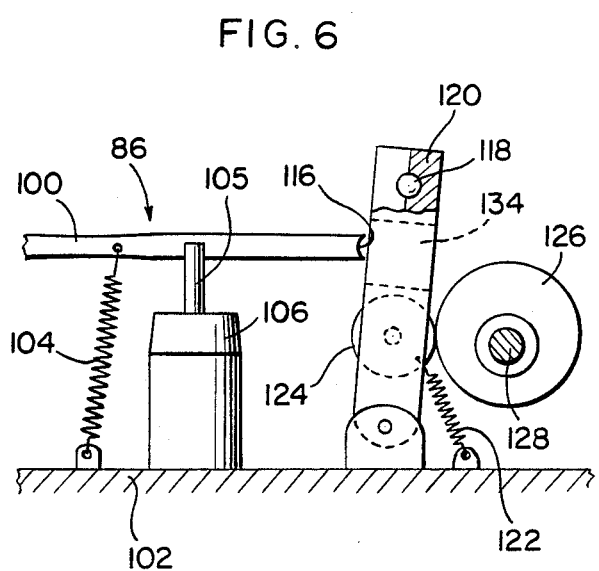
FIG. 6 is an elevational view of a portion of the film feed actuating mechanism, as seen along the line 6—6 in FIG. 5.

Referring to FIGS. 4, 5 and 6, the film feed actuating mechanism 86 of the film exposure device 34 includes a horizontally disposed coupling rod 100 biased toward a bottom wall 102 of the device by a coil spring 104 and mounted for slideable horizontal movement on an upward end of a vertically moveable plunger 105 of a solenoid 106 supported on the bottom wall. One end of the coupling rod 100 is connected, through a flexible hinge 108 and a coupling member 110, to a plunger 112 disposed in an aperture in a bushing 113 mounted in a frame end wall 114 in alignment with the push rod 82 (FIG. 3) of the film feeding mechanism 68 in the film magazine 32.

As is best shown in FIG. 6, an opposite end of the coupling rod 100 has a concave seat 116 which may be selectively engaged with a ball bearing 118 mounted in an operating lever 120 pivotally mounted at a lower end on the bottom wall 102 and biased clockwise, as viewed in FIG. 6, by a coil spring 122. An intermediate portion of the operating lever 120 carries a cam roller 124 engaged with an operating cam 126 on a cam shaft 128 having opposite ends journaled in frame sidewalls 130 and an intermediate portion journaled in an intermediate frame wall 132. Thus, as the cam shaft 128 rotates in an initial portion of a film feeding-and-exposure operation, the operating lever 120 will be pivoted by the cam 126 to move the coupling rod 100 to the right in FIG. 4, thereby actuating the film feeding mechanism 68 in the film magazine 32 as above described.

The film feed actuating mechanism 86 may be selectively deactivated to preclude feeding of one of the sheets of film 46 from the film magazine 32, if so desired. For example, at the end of a coupled film sequence in the film exposure device 34 as disclosed herein, after the last film 46 in the sequence is exposed, a new feed cycle must be initiated to feed the last exposed film out of the film exposure device to the film-receiving cassette 36. To prevent a new film 46 from being fed into the film exposure device 34 from the film magazine 32, the film feed actuating mechanism 86 is disabled. For this purpose, as is best shown in FIG. 6, the operating lever 120 is provided with a vertical slot 134 therethrough. When it is desired to deactivate the actuating mechanism 86, the solenoid 106 is operated to permit the coupling rod 100 to be moved vertically downward by the spring 104, thereby aligning the right-hand end of the rod, as viewed in FIG. 6, with the slot 134 in the operating lever 120. Accordingly, when the operating lever 120 then is pivoted by the operating cam 126, the adjacent end of the coupling rod 100 merely passes through the slot 134 in the operating lever without causing operation of the film feeding mechanism 68 in the film magazine 32.

Referring to FIGS. 7 and 8, the film clamping mechanism 88 of the film exposure device 34 includes an upper clamping assembly 136 in the form of a backing plate 138 of a suitable plastic material and an upper x-ray intensifying screen 140 bonded or otherwise suitably mounted to the underside of the upper backing plate. The upper backing plate 138 and the upper x-ray intensifying screen 140 are fixedly mounted in the upper end of the frame end wall 114 and an opposite frame end wall 142 of the film exposure device 34. In use, an object to be x-rayed, such as a portion of a human body, is positioned on the upper backing plate 138 in a known manner.

The film clamping mechanism 88 further includes a lower clamping assembly 144 comprising a lower pressure plate 146 formed of a suitable light-weight, flexible material, such as aluminum and, as shown in FIG. 8, having a natural substantially flat configuration. A foam pad 148 is bonded to the top of the pressure plate 146 and a second x-ray intensifying screen 150 is bonded or otherwise suitably mounted on top of the foam pad. After one of the sheets of film 46 has been fed into the exposure position in the film exposure device 34, as illustrated in FIG. 7, the lower clamping assembly 144 is moved upwardly to clamp the sheet of film against the upper x-ray intensifying screen 140, as shown in FIG. 8. During the clamping operation, the foam pad 150 compensates for irregularities in the surfaces of the backing plate 138, the pressure plate 146 and the x-ray intensifying screens 140 and 150, such that the film 46 is clamped uniformly therebetween with the application of minimum pressure.

The lower clamping assembly 144 is moved toward and away from the upper clamping assembly 136 by a mechanism 152 as shown in FIGS. 7 and 8. More specifically, opposite ends of the pressure plate 146 are provided with respective pairs of transversely spaced depending lugs 154 which are pivotally connected by pins 156 to upper ends of respective pairs of operating levers 158. Lower ends of the operating levers 158 are pivoted on a transversely extending pivot shaft 160, with one of the levers including a lost motion connection comprising an elongated longitudinally extending slot 162 in the lower end of the lever. The operating levers 158 also have intermediate portions pivotally mounted on respective transversely extending pivot shafts or pins 164 screw-threadably mounted in the frame sidewalls 130 of the film exposure device 34.

Outer ends of the lower clamping assembly 144 are biased upwardly by coil springs 168 mounted between the bottom surface of the pressure plate 146 and the bottom wall 102 (FIG. 4). Further, the weight of the lower clamping assembly 144 is counterbalanced by counterweights 170 slideably mounted on lower portions of the operating levers 158 and adjustably secured on the operating levers by set screws 172. Thus, the coil springs 168 and the counterweights 170 cooperate such that the coil springs can readily move the lower clamping assembly 144 upwardly into a film clamping position as shown in FIG. 8, and provide a construction in which the lower clamping assembly is essentially free-floating.

The lower clamping assembly moving mechanism 152 further comprises a pair of operating cams 174 secured to the cam shaft 128. The operating cams 174 are engaged with respective rollers 176 supported on the pivot shafts 160 for the lower ends of the operating levers 158. Thus, as the operating cams 174 are rotated, high portions of the cams cause the rollers 176 and the pivot shaft 160 to be moved upwardly, causing upward movement of the lower ends of the operating levers 158, and downward movement of the upper ends of the operating levers in counterclockwise and clockwise directions, respectively, as viewed in FIG. 7. The downward movement of the upper ends of the operating levers 158 causes downward movement of the lower clamping assembly 144, and at the same time causes upward flexing of the intermediate portion of the pressure plate 146, from its natural substantially flat configuration to flex the lower clamping assembly into an upward convex configuration as shown in FIG. 7. Thus, the lower clamping assembly 144 is moved into a lower open position for the feeding of one the sheets of film 46 into and out of the exposure position as above described. In this regard, it is to be understood that the deflection of the lower clamping assembly 144 in actual practice is only in the order of 1/16 of an inch, with the deflection thereof as shown in FIGS. 7, 9 and 11 being exaggerated for purposes of illustration.

After one of the sheets of film 46 has been fed into the exposure position in the film exposure device 34, as shown in FIG. 7, low portions of the operating cams 174 engage the rollers 176 on the lever pivot shaft 160 and permit the coil springs 168 and the counterweights 170 to move the lower clamping assembly 144 upwardly and back to its natural substantially flat configuration into clamping relationship with the sheet of film, as shown in FIG. 8. During this upward movement of the lower clamping assembly 144, initial clamping engagement with the sheet of film 46 is made with the center of the sheet of film by the upward convex central portion of the lower x-ray intensifying screen 150. Subsequently, clamping engagement is made with the remainder of the sheet of film 46 by the lower x-ray intensifying screen 150 progressively outward from the center of the sheet of film to the leading and trailing ends thereof. Thus, clamping of the sheet of film 46 is accomplished in a uniform and progressive manner without producing any wrinkling of the film during the clamping operation. Air also is squeezed from the space between the x-ray intensifying screens 140 and 150 and the film 46, in a relatively gentle fashion, which minimizes vibration and subsequent film blurring.

Another advantage of the film clamping mechanism 88, in which the upper backing plate 138 remains planar in operation, is that the backing plate can be of thin construction in comparison to that of film changers utilizing a bowed backing plate. As a result, the object being x-rayed can be located closer (e.g., within one-quarter inch) to the x-ray film 46, thereby producing higher resolution in the resultant x-ray film.

Referring to FIGS. 4 and 9, the film feeding mechanism 90 of the film exposure device 34 includes a pair of driven film feed-in wheels 178 and a pair of respective feed-in pinch rollers 180 located adjacent opposite sides of the device and adjacent a horizontal film-entrance slot 181 in the end wall 114 of the device. When one of the sheets of film 46 is fed into the film exposure device 34 from the film magazine 32 as above described, side portions of the film at its leading end are engaged between the feed-in wheels 178 and feed-in rollers 180, and the driven feed-in wheels then advance the film into the exposure position in the film exposure device. After the film 46 has been fed into the exposure position, the lower film 46 has been fed into the exposure position, the lower film clamping assembly 144 is moved upwardly as above described and the feed-in rollers 180 are moved out of engagement with the film.

More specifically, the feed-in wheels 178 are rotatably mounted adjacent inner sides of the frame sidewalls 130 on a support shaft 182 having opposite ends fixedly mounted in respective ones of the sidewalls. The feed-in rollers 180 are supported above the frame sidewalls 130 on the upper ends of operating levers 184 located adjacent outer sides of the frame sidewalls and pivoted at lower ends on pins 186 mounted in the sidewalls. The feed-in rollers 180 are biased away from their film-engaging positions by leaf springs 188 having first ends pivoted on the side walls 130, with the leaf springs disposed over extensions of the support shaft 182 and having opposite ends engaged with the operating levers 184.

Pivoting of the feed-in rollers 180 from their inoperative positions into their film-engaging positions is accomplished by spring-loaded ball plungers 190 mounted in block members 192 secured to the underside of the pressure plate 146 adjacent its opposite sides. The ball plungers 190 are engaged with inwardly extending lugs 193 on the operating levers 184 intermediate their ends, with the lugs extending through suitable slots 194 in the side walls 130. Thus, as the lower clamping assembly 144 is moved downwardly to its open position as shown in FIG. 7, the ball plungers 190 pivot the operating levers 184 to move the feed-in rollers 180 into clamping engagement with the sheet of film 46. When the lower clamping assembly 144 moves back upwardly into its closed clamping position as shown in FIG. 8, the leaf springs 188 bias the operating levers 184 to move the feed-in rollers 180 out of engagement with the sheet of film 46.

Similarly, the film feeding mechanism 90 includes a pair of driven feed-out wheels 196 and a pair of respective feed-out pinch rollers 198 mounted adjacent respective ones of the frame sidewalls 130 and adjacent a film-exit slot 200 in the end wall 142 of the film exposure device 34. The feed-out wheels 196 and rollers 198 cooperate with the feed-in wheels 178 and rollers 180 to feed an exposed one of the sheets of film 46 out of the exposure position into the film-receiving cassette 36.

As in the cause of the feed-in wheels 178, the feed-out wheels 196 are mounted adjacent inner sides of the frame sidewalls 130 on a drive shaft 202 having opposite ends mounted in respective ones of the sidewalls. The feed-out rollers 198 are mounted on the upper ends of operating levers 204 located adjacent outer sides of the sidewalls 130 and having lower ends pivoted on pins 206 mounted in the sidewalls. The feed-out rollers 198 are biased toward inoperative positions by leaf springs 208 and are moved into film-engaging positions by ball plungers 210 in block members 212 mounted on the underside of the pressure plate 146, with the ball plungers being engaged with lugs 214 projecting from the operating levers through slots 216 in the sidewalls 130.

Thus, as in the case of the feed-in rollers 180, when the lower clamping assembly 144 is moved to its open position as shown in FIG. 7, the ball plungers 210 pivot the operating levers 204 to move the feed-out rollers 198 into their film-engaging positions, and when the lower clamping assembly is moved upwardly into its clamping position as shown in FIG. 8, the leaf springs 208 pivot the operating levers to move the feed-out rollers out of film engagement. Preferably, the feed-out wheels 196 are driven faster than the feed-in wheels 178 to preclude overfeed of one of the sheets of film 46 onto the previous sheet of film during a film changing operation, to reduce the possibility of film-jamming in the film exposure device 34.

The first stop mechanism 92 of the film exposure device 34 comprises a pair of pivoted L-shaped members 218, each moveable between a lower retracted position as shown in solid lines at the right-hand side of FIG. 9, to permit feeding of one of the sheets of film 46 out of the device to the film-receiving cassette 36, and an upper position as shown in broken lines in FIG. 9, in which the stop members preclude forward feeding of the film beyond the exposure position. Movement of each of the stop mechanisms 92 into its lower retracted position is accomplished by an adjustable screw 220, on the respective block member 212, engaging a block member 222 secured to one leg 224 of the stop member and pivoted by a pin 226 on the inner side of the adjacent frame sidewall 130. The stop member 218 is biased counterclockwise, as viewed in FIG. 9, to move a second leg 228 of the stop member into its upper stop position, by a coil spring 230 connected between the first leg 224 and the bottom wall 102 (FIG. 4) of the film exposure device 34.

In a film feeding operation, as the leading end of the sheet of film 46 approaches the feed-out rollers 198, the lower clamping assembly 144 begins to move upwardly toward its film clamping position as shown in FIG. 8, permitting the stop mechanisms 92 to move into their upper stop positions. At the same time, the feed-in rollers 180 move upwardly and disengage from the film sheet 46 and the feed-out rollers 198 move upwardly away from the path of the film sheet. The film sheet 46, as a result of its own forward momentum, then continues to travel forward against the upper end of the second leg 228 of the stop member 218, with the speed of the film being slowed as a result of its initially engaging a leaf-type braking spring 232 secured to the second leg.

Referring to FIGS. 7 and 8, the second stop mechanism 94, which also slows down the film sheet 46 before it hits the stop mechanisms 92 and which prevents film recoil out of the exposure position, includes a pair of resilient leaf-type braking springs 234 (e.g., beryllium copper), one of which is shown in FIGS. 7 and 8, mounted on opposite sides of the pressure plate 146 and having portions projecting slightly above the level of the x-ray intensifying screen 150. As the lower clamping assembly 144 moves upwardly toward its clamping position shown in FIG. 8, projecting portions of the leaf springs 94 engage beneath side edge portions of the film sheet 46 to slow down the film sheet and prevent retrograde movement thereof.

FIG. 11 illustrates a feature of the invention which prevents film damage due to sticking of an exposed sheet of film 46 to the upper x-ray intensifying screen 140 after an exposure operation. For this purpose, the feed-in rollers 180 are moved into engagement with the exposed film 46 by the ball plungers 190 on the pressure plate 146 as the lower clamping assembly 144 is moved to its open position, prior to the film sheet being engaged by the feed-out rollers 198. As a result, if the exposed film sheet 46 sticks to the screen 140, the feed-in wheels 178 and rollers 180 cause the intermediate portion of the exposed film to buckle or to peel away from the screen, thereby preventing scratching of the exposed film as the feed-out wheels 196 and rollers 198 thereafter feed the exposed film from the film-exposure device 34 into the film-receiving cassette 36.

The film sensing mechanism 96 (FIG. 4) is in the form of an optical sensing device which is mounted on the exit end wall 142 of the film exposure device 34 and which utilizes infrared light, to which the x-ray film sheets 46 are not sensitive, for sensing purposes. At the beginning of a film exposure sequencing operation, if the optical sensing device 96 is not blocked, indicating that the film exposure device 34 is ready to receive one of the sheets of film 46 from the film magazine 32, upon energization of a "start" button (not shown) on a keyboard of the computer 30 (FIG. 1), the controller 28, under the direction of the computer, initiates a film feeding- and-exposure operation. If the exposed sheet of film 46 subsequently feeds properly out of the exposure position and if the next sheet of film 46 feeds properly into the exposure position, such that a gap between the trailing edge of the exposed film and the leading edge of the new film is sensed by the optical sensing device 96 within a fixed time period, the apparatus continues in its normal cycle of operation. However, in the event that one of the sheets of film 46 in the sequence does not feed properly into the exposure position, such that the gap between the successive films is not sensed by the optical sensing device 96, this condition is sensed by the controller and operation is interrupted.

Similarly, if the sheet of film 46 has fed properly into the exposure position and an x-ray has been produced, but the exposed film subsequently does not feed properly out of the exposure position, such that the optical sensing device 96 remains blocked by the sheet of film, operation also is interrupted. In this connection, where the film charger 22 is being used in conjunction with an angiographic injector 26, as illustrated in FIG. 1, operation of the angiographic injector, so as to stop the introduction of dye into the patient, is also interrupted. On the other hand, where two of the film changers 22 are being used in conjunction with the angiographic injector 26 as shown in FIG. 1, the computer 30 may be programmed such that even though one film changer develops a film-jam and is rendered inoperative, the other film changer and the angiographic injector remain operative and continue to produce x-rays.

Referring to FIG. 4, the indicia printing mechanism 98 includes an electronic liquid crystal display (LCD) 236, a pair of flash tubes 238 located on opposite sides of a focusing lens 240 and a reflecting mirror 242. Prior to a film exposure operation, desired indicia, such as the date, patient's name and an x-ray film number, are set on the liquid crystal display 236 by an operator punching this information into the liquid crystal display from the keyboard of the computer 30. Where a series of x-rays are being produced, the sequential changing of the film numbers in the liquid crystal display 236, so as to provide a series of films with sequential numbering thereon, then is provided automatically by the computer 30. To produce the indicia on one of the sheets of film 46 in each film exposure operation, the flash tubes 238 are energized, causing the indicia then appearing on the liquid crystal display 236 to be focused by the lens 240 and reflected by the mirror 242 upwardly onto an edge portion of the film, to produce the desired indicia on the film in a bold white image on the dark exposed background of the film.

Referring to FIG. 4, the drive mechanism 99 of the film exposure device 34 includes a drive motor 244 supported on the bottom wall 102 and connected by a timing belt 246 to a sprocket 248 on the drive shaft 202 for the film feed-out wheels 196. The drive shaft 202 is connected by another sprocket 250 and timing belt 252 to a sprocket 254 on the drive shaft 182 for the feed-in wheels 178. Thus the wheels 178 and 196 are continuously driven with driving engagement of the wheels with one of the sheets of film 46 being commenced and interrupted by moving their respective pinch rollers 180 and 198 into and out of film-engaging positions as above described. The drive motor 244 is of a known permanent magnet DC type which will operate at a constant speed under a preselected fixed bias voltage without feedback control and thus without the need for an electronic motor servo-control system to synchronize two of the motors when two film changers 22 are used in combination, as shown in FIG. 1.

With further reference to FIG. 4, operation of the cams 174 to permit the coil springs 168 and the counterweights 170 (FIGS. 7 and 8) to move the lower clamping assembly 144 into its upper clamping position, as shown in FIG. 8, is accomplished through a single-revolution clutch 256 of a known type. For example, the clutch 256 may include an internal drive spring (not shown) which drives the clutch one revolution upon the release of a retainer latch 258 pivoted on the bottom wall 102. The clutch 256 is operated by a sprocket 260 connected to a sprocket 262 on the feed-in wheel support shaft 182 by a timing belt 264. In operation, a solenoid 266 of the single-revolution clutch 256 is operated from the controller 28 to pivot the retaining latch 258 and render the clutch operative, whereupon the clutch rotates one revolution to feed one of the sheets of film 46 into the exposure position, and to operate the cams 174 and permit clamping of the sheet of film for an exposure operation.

Figure 12A:
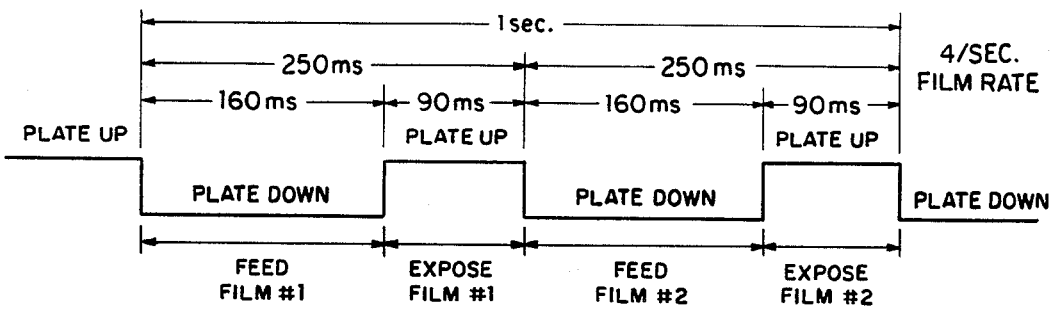
FIG. 12a is a timing diagram for the film changer of the invention illustrating film feed and exposure times, respectively, for a first film rate.
Figure 12B:
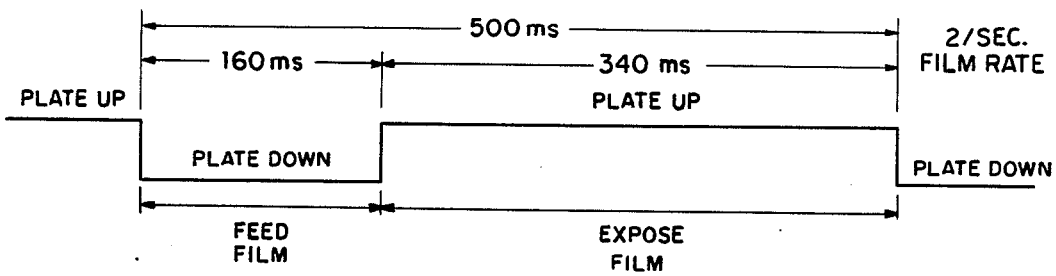
FIG. 12b is a timing diagram as shown in FIG. 12a, for a second film rate in the film changer of the invention.

Referring to FIGS. 12 and 13, it is shown how the film changer 22 in accordance with the invention can be used to increase available film exposure time for various film rates in comparison to a known prior art device. Specifically, referring to FIGS. 12A and 12B, the film changer 22 always initiates a film feed cycle of fixed duration regardless of film rate. This occurs because the main drive motor 244 turns at a constant speed and the entire film feed cycle takes place during one revolution of the cam shaft 128 activated by the slip clutch 256. For example, if the feed cycle always takes 160 ms and a 4/sec. film rate (FIG. 12A) requires 250 ms between successive films, this leaves a 90 ms film exposure time. For a 2/sec. film rate (FIG. 12B), the feed cycle still takes 160 ms and 340 ms is available for the film exposure time.

Figure 13A:
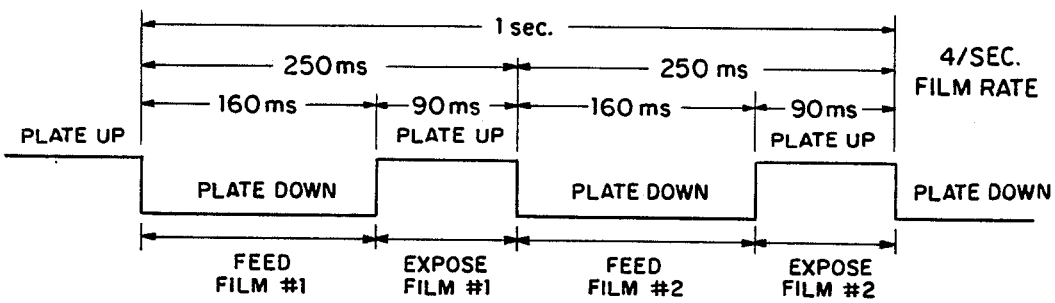
FIG. 13a is a timing diagram as shown in FIG. 12a, for a first film rate in a prior art film changer.
Figure 13B:
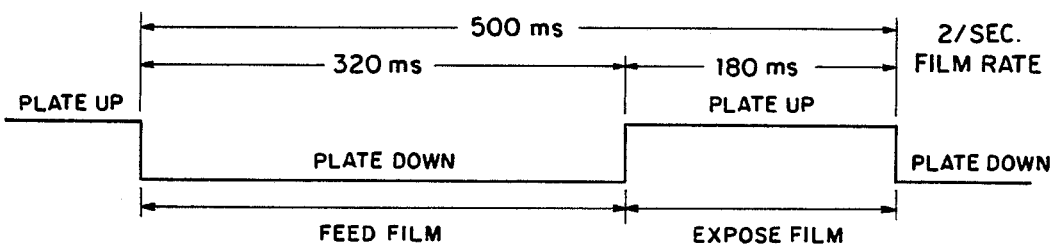
FIG. 13b is a timing diagram as shown in FIG. 13a, for a second film rate in the prior art film changer.

In the known prior art device, as illustrated by FIGS. 13A and 13B, the film clamping pressure plate is constantly moving in a fixed cycle determined by drive motor speed and film exposure time is a fixed proportion of the film feed cycle. For example, if the film feed cycle is 160 ms at a 4/sec. film rate, as shown in FIG. 13A, the film feed cycle lengthens to 320 ms at a film rate of 2/sec, as illustrated in FIG. 13B. The film exposure time available at the 2/sec. film rate is therefore only 180 ms, or approximately one-half that available with applicant's invention.

Referring again to FIG. 1, each of the x-ray generators 24-1 and 24-2 normally has an inherent time delay, such as up to 50 ms, between the time at which the generator receives a command from the controller 28 to fire and the time at which the generator begins to produce x-rays for a film exposure. Accordingly, to increase the rate at which the films 46 can be processed, each of the generators 24-1 and 24-2 is given a firing command before the respective film to be exposed actually reaches the exposure position in the associated film exposure device 34. For this purpose, the computer 30 includes a suitable variable time delay circuit 30D which can be programmed to adjust the time delay between the time at which a firing command is transmitted to the generator 24-1 or 24-2 from the controller 28 and the time at which the film 46 reaches the exposure position and the generator beings producing x-rays to expose the film, in accordance with the inherent time delay of the particular generator.

Referring to FIGS. 14 and 15, the film-receiving cassette 36 which includes no film driving mechanism, includes a guide plate 270 having a spiral configuration and mounted in the box-shaped housing 42 of the cassette. More specifically, the guide plate has an upper edge portion suitable secured to an inwardly projecting flange 272 of a vertical front wall 274 of the box-shaped housing 42, above a horizontal feed-in slot 276 in the vertical front wall. The guide plate 270 has an inwardly spiraling configuration extending in excess of one and one half 360° turns, as is clearly shown in FIGS. 14 and 15 so as to define an outer open end 278 and an inner end 280.

Thus, as one of the sheets of film 46 is fed from the film exposure device 34 into the film-receiving cassette 36 at the end of an exposure operation, the leading end of the film initially engages an interior surface of the guide plate 270 and feeds along the interior surface such that the film assumes a configuration corresponding to that of the guide plate, as is illustrated in FIG. 12, without a leading end of the film engaging a trailing portion of the film. As a trailing end of the film 46 then passes through the horizontal feed slot 276 in the housing front wall 274, the trailing end of the film "snaps" upwardly into a position in complementary engagement with the guide plate 270, as a result of the inherent coiled energy in the film, to enable the feeding of the next sheet of film into the film-receiving cassette 36 without interference from the previously-fed sheet of film. This feeding procedure may then be repeated with succeeding sheets of film 46 until the space within the spiral guide plate 270 has become filled with the sheets of film, whereupon the film-receiving cassette 36 may be removed from the film exposure device 34 and then to a developing room for processing of the exposed films.

An advantage of the film-receiving cassette 36 is its compact construction, which enables the exposed films 46 to be stored in a small space, thus shortening the overall height and reducing the weight of the film changer 22. The construction of the film-receiving cassette also enables exposed films 46 to be readily removed therefrom without producing inadvertent static discharge, in comparison to prior known flat-type film receivers.

In summary, there has been disclosed a compact x-ray film changer 22 which is especially suited for use with an angiographic injector 26 and which produces precision high quality x-rays having excellent resolution, operates at high speed and a low power level, and requires low maintenance. More specifically, the sheets of film 46 are automatically fed from the film magazine 32 in sequence into the film exposure device 34 by operation of the feeding mechanism 68 in the film magazine from the actuating mechanism 86 in the film exposure device. In the film exposure device 34, the essentially free-floating lower clamping assembly 144 applies pressure to one of the sheets of film 46 in the exposure position from the center of the film progressively outward toward its leading and trailing ends, to avoid wrinkling of the film, vibration and subsequent film blurring. As a result of the foam pad 148 of the lower clamping assembly 144, the pressure applied to the film 46 is uniform and the magnitude of the clamping pressure is kept to a minimum. The thin construction of the upper backing plate 136 permits an object being x-rayed to be located close to the x-ray film 46, to produce an x-ray of high resolution. Film jams are reduced by the optical sensing device 96, the ability to selectively deactivate the film feed actuating mechanism 86, and the feed-out wheels 196 being driven faster than the feed-in wheels 180 to prevent over feed of one film onto another. The feed-in wheels 178 and rollers 160, which drivingly engage an exposed sheet of film 46 prior to the feed-out wheels 196 and rollers 198, produce buckling or peeling of the exposed sheet of film away from the upper x-ray intensifying screen 140, to preclude striking of the exposed sheet of film to the screen, thus reducing scratching and the build up of static charge on the film. Precise positioning of the sheets of film 46 in the exposure position is provided by the stop mechanism 92, 94, and the optical-type indicia forming mechanism 98 readily produces easily readable white indicia on the films on a dark background. The use of a constant speed for the drive motor 244 and a film feed cycle of constant duration regardless of film rate, enables the use of a lower film rate to provide an increased film exposure time in a proven time period. Timing of the film changer 22 is readily accomplished in a simple manner by the single cam shaft 128 and the associated cams 126 and 174. A variable delay between a film changer command to the x-ray generator(s) 24 and the actual onset of x-rays is readily achieved by the delay circuit in the controller 28. The two film changers 22-1 and 22-2 can readily be made to fire alternatively, simultaneously or individually from the controller 28 under computer control. The film cassette 36, comprising the spirally arranged inner guide plate 270, provides a new and improved compact mechanism for storing the exposed films 46 in a relatively small space, and also reduces the possibility of static discharge and the forming of undesirable "rain tree" patterns on the exposed films.

Various other modifications, adaptations and alternative designs are, of course, possible in light of the above teachings. Therefore, it should be understood at this time that within the scope of the appended claims, the invention may be practiced otherwise then as specifically described herein.

What is claimed is:

1. A medical film changer for an x-ray apparatus, which comprises:
   a magazine for holding a plurality of unexposed sheets of film;
   a film exposure device for receiving a sheet of film from the magazine, the film exposure device including a film backing plate and a film pressure plate having a natural substantially flat configuration, for receiving the sheet of film therebetween, and the pressure plate being movable toward and away from the backing plate;
   a film-receiving cassette adjacent the film exposure device for receiving an exposed sheet of film from the exposure device, the film-receiving cassette including a guide plate formed into an inwardly spiraling configuration having an open end and an inner end;
   first film feeding means in the magazine for feeding sheets of film to the film exposure device;
   actuating means in the film exposure device for operating the film feeding means in the magazine;
   second film feeding means in the film exposure device for feeding unexposed sheets of film fed to the exposure device by the first feeding means in the magazine, into a exposure position between the backing plate and the pressure plate;
   means in the film exposure device for moving the pressure plate toward and away from the backing plate;
   means in the film exposure device for flexing the pressure plate from its natural substantially flat configuration into a convex configuration as the pressure plate is moving away from the backing plate by the pressure plate moving means, with outer ends of the pressure plate moving back to initial positions as the pressure plate is moved toward the backing plate and back to its natural substantially flat configuration by the moving means, such that the pressure plate applies pressure to the unexposed sheet of film progressively outward from the center of the sheet of film toward opposite ends thereof; and
   third film feeding means in the film exposure device for feeding the exposed sheet of film out of the exposure device into the open end of the spirally formed guide plate of the film-receiving cassette such that the exposed sheet of film travels along an interior surface of the guide plate and assumes the spiral configuration thereof.

2. The medical film changer as recited in claim 1, in which the film changer is to be used in conjunction with an angiographic injector, and which further comprises:
   optical means in the film exposure device for sensing when a sheet of film has been properly fed into and out of the exposure position in the exposure device from the film magazine and into the film cassette, respectively; and
   means for de-energizing the angiographic injector when the optical means detects that a sheet of film has not been properly fed into and out of the exposure position.

3. The medical film changer as recited in claim 1, which further comprises:
   an x-ray generator for producing x-rays to expose a sheet of film in the exposure position in the film exposure device;
   means for transmitting a firing command to the x-ray generator before each unexposed sheet of film reaches the exposure position; and
   programmable timing circuit delay means for varying the delay between the time at which the firing command is transmitted to the x-ray generator and the time at which the unexposed film reaches the exposure position.

4. The medical film changer as recited in claim 1, which further comprises:
   drive means for operating the actuating means in the film exposure device on a fixed feed cycle time regardless of film processing rate, to lengthen film exposure times as the film processing rate is reduced, the drive means including a continuous speed motor and a single revolution clutch connectable to the continuous speed motor to operate the actuating means through each film feed cycle.

5. A medical film exposure device for an x-ray apparatus, which comprises:
   a backing plate;
   a pressure plate mounted in opposed relationship to the backing plate such that a film to be exposed can be positioned between the backing plate and the pressure plate, the pressure plate having a natural substantially flat configuration;

means for moving the pressure plate toward and away from the backing plate, to clamp and release the film, respectively; and means for flexing the pressure plate from its natural substantially flat configuration into a convex configuration as the pressure plate is moved away from the backing plate, with outer ends of the pressure plate returning to initial positions as the pressure plate is moved toward the backing plate and back to its natural substantially flat configuration, such that the pressure plate applies pressure to the unexposed sheet of film progressively outward from the center of the sheet of film to opposite ends thereof.

6. The medical film exposure device as recited in claim 5, which further comprises:

resilient means for biasing outer portions of the pressure plate toward the backing plate.

7. The medical film exposure device as recited in claim 5, which further comprises:

means, including an electronic display, for forming on a film, white indicia on a dark background, as the film is exposed in the exposure device.

8. The medical film exposure device as recited in claim 5, which further comprises:

means for counterbalancing the weight of the pressure plate such that the pressure plate is essentially free-floating during operation.

9. The medical film exposure device as recited in claim 8, which further comprises:

means for buckling at least an intermediate portion of a film in a direction away from the backing plate after an exposure operation, to prevent sticking of the film in the device.

10. The medical film exposure device as recited in claim 5, which further comprises:

means for buckling at least an intermediate portion of a film in a direction away from the backing plate after an exposure operation, to prevent sticking of the film in the device.

11. The medical film exposure device as recited in claim 10, in which:

the film buckling means includes at least one film feed roller.

12. The medical film exposure device as recited in claim 5, which further comprises:

feed-in wheels and pinch rollers mounted adjacent an entrance end of the device for feeding a film into the device;

feed-out wheels and pinch rollers mounted adjacent an exit end of the device for feeding the film out of the device; and means for driving the feed-in and feed-out wheels.

13. The medical film exposure device, as recited in claim 12, in which:

the feed-in and feed-out pinch rollers are mounted for movement into and out of engagement with a film; and means are provided for moving the feed-in and feed-out rollers into and out of engagement with the film.

14. The medical film exposure device as recited in claim 13, in which:

the drive means drives the feed-in and feed-out wheels continuously.

15. The medical film exposure device as recited in claim 13, in which:

the feed-in and feed-out rollers are moved into and out of engagement with the film in response to movement of the pressure plate away from and toward the backing plate, respectively.

16. The medical film exposure device as recited in claim 13, in which:

the roller moving means moves the feed-in rollers into engagement with the film prior to moving the feed-out rollers into engagement with the film, after an exposure operation.

17. The medical film exposure device as recited in claim 12, in which:

the drive means drives the feed-out wheels at a slightly faster rate than the feed-in wheels.

18. The medical film exposure device as recited in claim 12, which further comprises:

stop means mounted for movement between an operative position for precluding movement of the film out of the exposure position, and a retracted position to permit feeding of the film out of the exposure position; and means for moving the stop means between the operative and retracted positions in timed relation to movement of the pressure plate toward and away from the backing plate, respectively.

19. The medical film exposure device as recited in claim 18, in which:

the stop means includes a pivoted lever for precluding overfeeding of the film beyond the exposure position.

20. The medical film exposure device as recited in claim 12, which further comprises:

optical sensor means for determining when a film has been properly fed into and out of the exposure device.

21. The medical film exposure device as recited in claim 20, which further comprises:

means responsive to the optical sensor means for de-energizing an associated angiographic injector when a film has not been properly fed into or out of the exposure device.

22. A medical film exposure device for an x-ray apparatus, which comprises:

clamping means movable from an open position into a closed position for clamping a sheet of film for an exposure operation, the clamping means including at least one movable clamping member movable between the open and closed positions;

continuously driven feed wheel means for feeding the sheet of film into and out of an exposure position between the clamping means when the clamping means is in the open position; and pinch roller means movable into and out of engagement with the sheet of film for pressing the film against the feed wheel means and causing selective feeding of the sheet of film by the feed wheels means, the pinch roller means including pinch rollers supported on pivoted levers biased to an inoperative position, and the pivoted levers being engageable by the movable clamping member as the clamping member moves to the open position, so that the levers are moved into an operative position in which the pinch rollers engage the film for a film feeding operation.

23. The medical film exposure device for an x-ray apparatus as recited in claim 22, which further comprises:

stop means for precluding overfeed of the sheet of film into the exposure position, said stop means being movable into and out of a film-stopping position in timed relation to movement of the clamping means into its closed and open positions, respectively.

24. A medical film exposure device for an x-ray apparatus, which comprises:
   a backing plate;
   a pressure plate mounted in opposed relationship to the backing plate such that a film to be exposed can be positioned between the backing plate and the pressure plate;
   means for moving the pressure plate toward and away from the backing plate, to clamp and release the film, respectively; and
   means for flexing the pressure plate into a convex configuration as the pressure plate is moved away from the backing plate, with outer ends of the pressure plate returning to initial positions as the pressure plate is moved toward the backing plate, such that the pressure plate applies pressure to the unexposed sheet of film progressively outward from the center of the sheet of film to opposite ends thereof;
   the pressure plate moving means and the pressure plate flexing means comprising:
      first and second lever means having outer ends pivoted to respective outer ends of the pressure plate and having inner ends pivoted to one another;
      first and second support means for pivotally mounting the first and second lever means, respectively, for pivotal movement about intermediate portions thereof; and
      means for causing movement of the pivotally interconnected inner ends of the first and second lever means toward the backing plate, to pivot the lever means about their respective support means, to cause movement of the pressure plate away from the backing plate and flexing of outer ends of the pressure plate away from the backing plate.

25. The medical film exposure device as recited in claim 24, in which:
   the movement-causing means is a cam means.

26. The medical film exposure device as recited in claim 24, which further comprises:
   resilient means for biasing the outer ends of the pressure plate toward the backing plate.

27. The medical film exposure device as recited in claim 24, which further comprises:
   means for biasing the pivotally interconnected inner ends of the first and second lever means away from the pressure plate, to counteract the weight of the pressure plate such that the pressure plate is essentially free-floating.

28. The medical film exposure holding device as recited in claim 27, in which:
   the biasing means includes counter-weights mounted on inner end portions of the first and second lever means inside the intermediate pivoted portions of the lever means.

29. The medical film exposure device as recited in claim 28, which further comprises:
   resilient means for biasing the outer ends of the pressure plate toward the backing plate.

30. A medical film exposure device for an x-ray apparatus, which comprises:
   a backing plate;
   a pressure plate mounted in opposed relationship to the backing plate such that a film to be exposed can be positioned between the backing plate and the pressure plate;
   means for moving the pressure plate toward and away from the backing plate, to clamp and release the film, respectively;
   means for flexing the pressure plate into a convex configuration as the pressure plate is moved away from the backing plate, with outer ends of the pressure plate returning to initial positions as the pressure plate is moved toward the backing plate, such that the pressure plate applies pressure to the unexposed sheet of film progressively outward from the center of the sheet of film to opposite ends thereof; and
   means for feeding a film into and out of the film exposure device, the film feeding means comprising:
      a pivoted lever having an opening therein;
      a longitudinally reciprocable feed rod having one end engageable by the pivoted lever;
      cam means for pivoting the lever and causing longitudinal movement of the feed rod; and
      means for selectively moving the one end of the feed rod into alignment with the opening in the pivoted lever to preclude longitudinal movement of the feed rod by the lever.

31. A medical film exposure device for an x-ray apparatus, which comprises:
   a backing plate;
   a pressure plate mounted in opposed relationship to the backing plate such that a film to be exposed can be positioned between the backing plate and the pressure plate;
   means for moving the pressure plate toward and away from the backing plate, to clamp and release the film, respectively;
   means for flexing the pressure plate into a convex configuration as the pressure plate is moved away the backing plate, with outer ends of the pressure plate returning to initial positions as the pressure plate is moved toward the backing plate, such that the pressure plate applies pressure to the unexposed sheet of film progressively outward from the center of the sheet of film to opposite ends thereof;
   means for feeding a film into and out of the film exposure device;
   a continuously running drive motor; and
   a single revolution clutch connectable to the continuously running drive motor for operating the pressure plate moving means and the film feeding means and producing an operating cycle of the medical film exposure device.

32. A medical film-processing device for an x-ray apparatus, which comprises:
   a medical film exposure device for holding a sheet of film during an exposure operation;
   a cassette, which includes no film driving mechanism, for receiving successively exposed films from the film exposure device, the cassette including a single guide plate disposed in the cassette and formed into an inwardly spiraling configuration having an outer open end and an inner end, such that an initial film fed into the open end of the spiraling configuration and fed along an interior surface of the guide plate assumes a configuration corresponding to that of the guide plate, and subsequently received films each nest in spiral relationship inside a respective previously received film, to facilitate storage of the films in a small space; and film feeding means in the film exposure device for feeding each of the exposed films from the film exposure device into the cassette and along a path essentially parallel to the interior surface of the guide plate after exposure of the film.

33. The medical film processing device as recited in claim 32, in which the cassette further comprises:
an essentially box-shaped housing having a feed slot in one wall thereof, the inwardly spiraling guide plate being mounted in the housing so that the open end of the spiral configuration of the guide plate is aligned with the feed slot in the one wall of the housing during feeding of the successive films into the guide plate.

34. The medical film processing device as recited in claim 33, wherein the inwardly spiraling guide plate includes an outer edge portion, the guide plate outer edge portion and the feed slot in the one wall of the housing being spaced relative to each other so that a trailing edge of the initial film passing through the feed slot snaps into complementary engagement with the interior surface of the guide plate as a result of inherent energy in the film, and trailing edges of the subsequently received films snap into complementary engagement with a respective previously received film to facilitate the feeding of the films into the cassette in the nested spiral relationship inside one another.

35. The medical film processing device as recited in claim 34, which further comprises:
a film magazine for holding a stack of individual sheets of film; and
second film feeding means for sequentially feeding the sheets of film from the magazine into the film exposure device and the first-mentioned film feeding means, the second film feeding means being located adjacent an entrance end of the film exposure device and the first-mentioned film feeding means being located adjacent an exit end of the film exposure device, respectively.

36. The medical film-processing device of claim 32, wherein said guide plate extends in the spiral configuration in excess of one 360° turn.

37. The medical film-processing device of claim 32, wherein said guide plate extends in the spiral configuration in excess of one and one-half 360° turns.

38. A cassette which includes no film driving mechanism, for receiving successively exposed films from a film exposure device, which comprises:
an essentially box-shaped housing having a film-receiving feed-in slot in one wall thereof; and
a single guide plate formed into an inwardly spiraling configuration having an outer open end and an inner end, such that an initial film fed into the open end of the spiraling configuration and fed along an interior surface of the spiral guide plate assumes a configuration corresponding to that of the guide plate, and subsequently received films each nest in spiral relationship inside a respective previously received film, to facilitate storage of the films in a small space.

39. The cassette as recited in claim 38, wherein the open end of the spiral configuration of the guide plate is aligned with the feed-in slot in the one wall of the housing during feeding of the successive films into the guide plate and the guide plate includes an outer edge portion, the guide plate outer edge portion and the feed-in slot being spaced relative to each other so that a trailing edge of an initial film passing through the feed-in slot snaps into complimentary engagement with the interior surface of the guide plate as a result of inherent energy in the film, and trailing edges of subsequently received films snap into complementary engagement with a respective previously received film to facilitate feeding of the films into the cassette in the nested spiral relationship inside one another.

40. The cassette of claim 38, wherein said guide plate extends in the spiral configuration in excess of one 360° turn.

41. The cassette of claim 38, wherein said guide plate extends in the spiral configuration in excess of one and one-half 360° turns.

42. The cassette of claim 39, wherein said guide plate extends in the spiral configuration in excess of one 360° turn.

43. The cassette of claim 39, wherein said guide plate extends in the spiral configuration in excess of one and one-half 360° turns.

* * * * *